Figure 1:
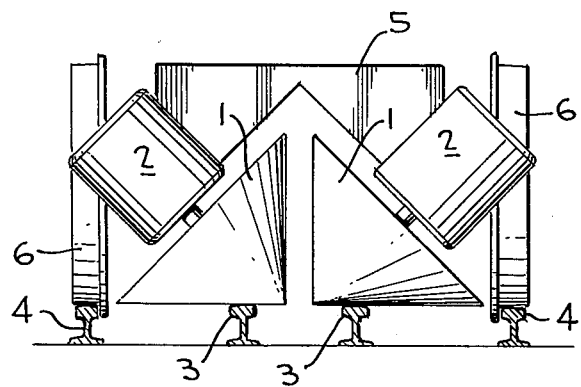

United States Patent [19]
Jarnaker

[11] 3,911,827
[45] Oct. 14, 1975

[54] APPARATUS FOR AUTOMATICALLY CONTROLLING THE SPEED OF A TRACK-GUIDED VEHICLE

[76] Inventor: Johan Julius Jarnaker, Box 9, 776 00 Hedemora, Sweden

[22] Filed: Nov. 10, 1972

[21] Appl. No.: 305,361

[30] Foreign Application Priority Data
Nov. 11, 1971 Sweden............................. 14425/71
Sept. 14, 1972 Sweden............................. 11846/72

[52] U.S. Cl............................ 104/147 R; 105/29 R
[51] Int. Cl.²......................................... B61B 13/00
[58] Field of Search ........... 104/118, 119, 120, 147, 104/148, 168; 105/29 R; 180/7 R

[56] References Cited
UNITED STATES PATENTS

| | | | |
|---|---|---|---|
| 336,247 | 2/1886 | Mack................................. | 104/119 |
| 1,541,281 | 6/1925 | Ricker ............................... | 104/119 |
| 3,001,601 | 9/1961 | Aghnides ........................... | 180/7 R |
| 3,340,821 | 9/1967 | Wesener ........................... | 105/29 R |
| 3,811,384 | 5/1974 | Brown.............................. | 104/147 R |

*Primary Examiner*—Lloyd L. King
*Assistant Examiner*—D. W. Keen
*Attorney, Agent, or Firm*—Sherman & Shalloway

[57] ABSTRACT

Apparatus for automatically controlling the speed of a vehicle guided along a track including at least one conical member rotatably mounted on the vehicle and at least one speed regulating rail disposed along the track and varying in distance therefrom such that the diameter of the conical member at the point of contact with the speed regulating rail varies to permit automatic speed control by driving the conical member at a constant speed or by controlling the speed of driving motors in response to the speed of rotation of the conical member.

15 Claims, 9 Drawing Figures

APPARATUS FOR AUTOMATICALLY CONTROLLING THE SPEED OF A TRACK-GUIDED VEHICLE

The present invention relates to an apparatus for automatically controlling the speed of vehicles or engine guided along a track parts, substantially characterized in that the vehicle carries at least one bevel or cone rotatable around its axis, lying close to a speed regulating rail or another track surface forming a varying curve relative to the track of the vehicle to contact a smaller diameter point of the cone at a lower speed and a larger diameter point of the cone at a higher speed, respectively.

A basic object of the invention is to provide automatic control of the moving rate or speed of track-guided vehicles or engine parts, which control is completely traffic safe and reliable in operation. For this purpose the moving rate should be exactly determined at each track point so that there is no possibility of a driverless vehicle exceeding or dropping below a desired speed. This is most easily and safely mechanically achieved, by providing the vehicle with at least one rotatable bevel or conical member contacting a speed regulating rail or the like having a varying curve such that a decreasing bevel diameter decreases speed and an increasing diameter increases speed. If the bevel is rotating with a constant rate the point of contact with the rail determines the programmed speed at each track point.

In principle there are two different main applications of the invention, referred to as A and B. The application (A) is that the rate adjusting bevel or bevels of a vehicle are driven by trip motors, preferably directly coupled and that the bevels with their motors are mounted in bearings in a trestle on which a part of the vehicle and its cargo are resting. The friction between the bevels and the rail is then sufficient to transfer the rotation work from the motors and drive the vehicle. The application (B) is that the rotatable bevel carried by a vehicle does not drive the vehicle but is used only to control speed such as by providing the bevel with a centrifugal governor which moves a bar extending along the axis of rotation of the bevel to vary a resistance, such as a potentiometer, in a circuit for supplying electricity to electric motors driving the vehicle in conventional manner.

Accordingly, it is a basic object of the present invention to control the speed of a vehicle by the position at which a speed regulating rail contacts a bevel or conical member either by positively driving the conical member at a constant speed to drive the vehicle by contact with the rail or by controlling the speed of driving motors in response to the speed of rotation of the conical member.

Figure 3:
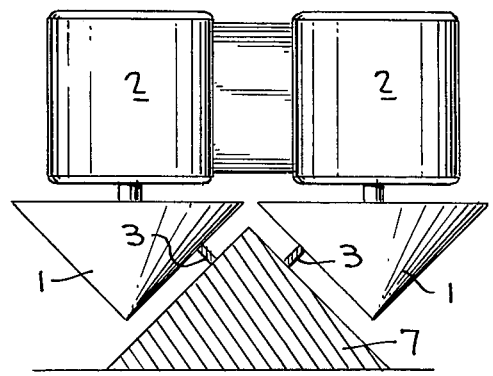
Figure 2:
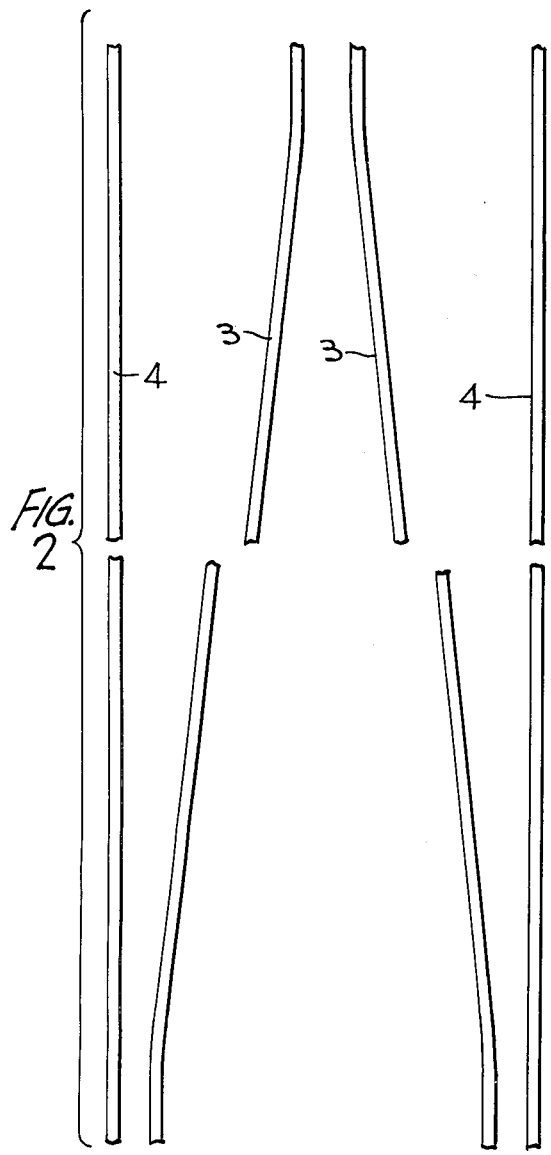
Figure 4:
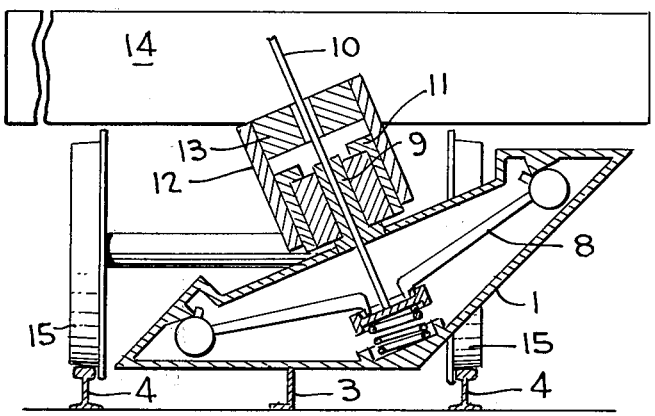
Figure 5:
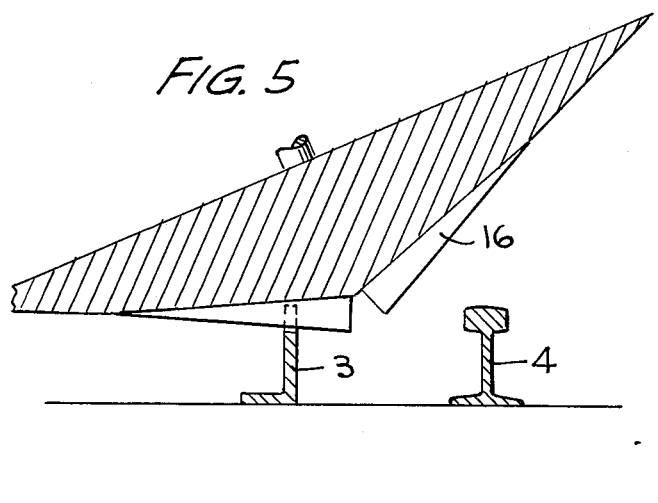
Figure 6:
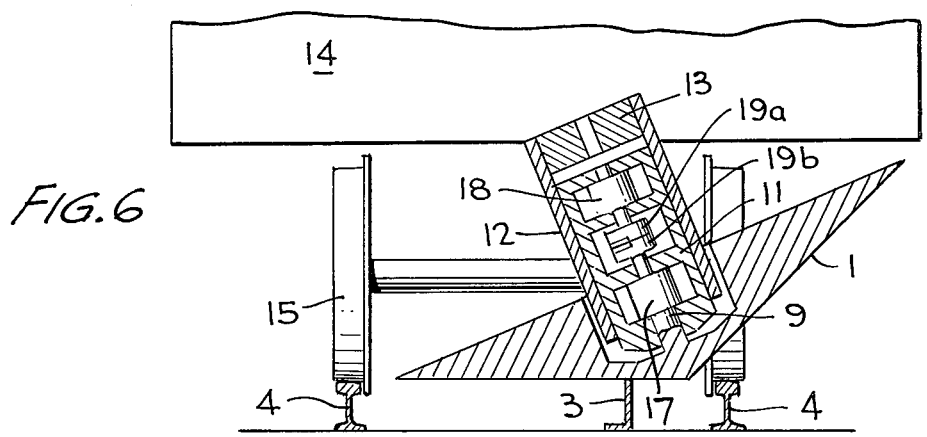
Figure 7:
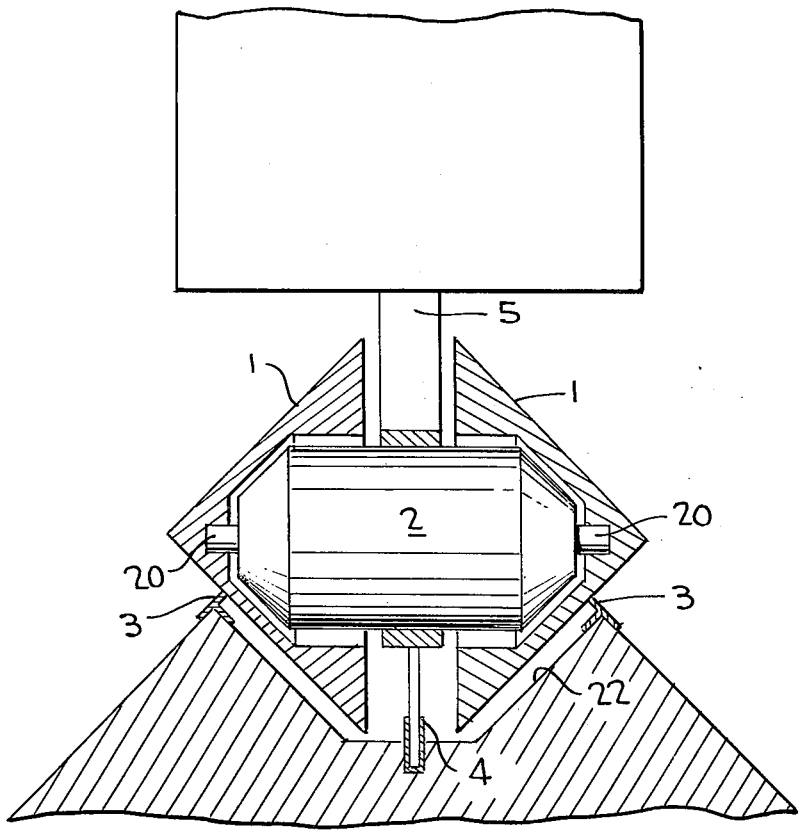
Figure 8:
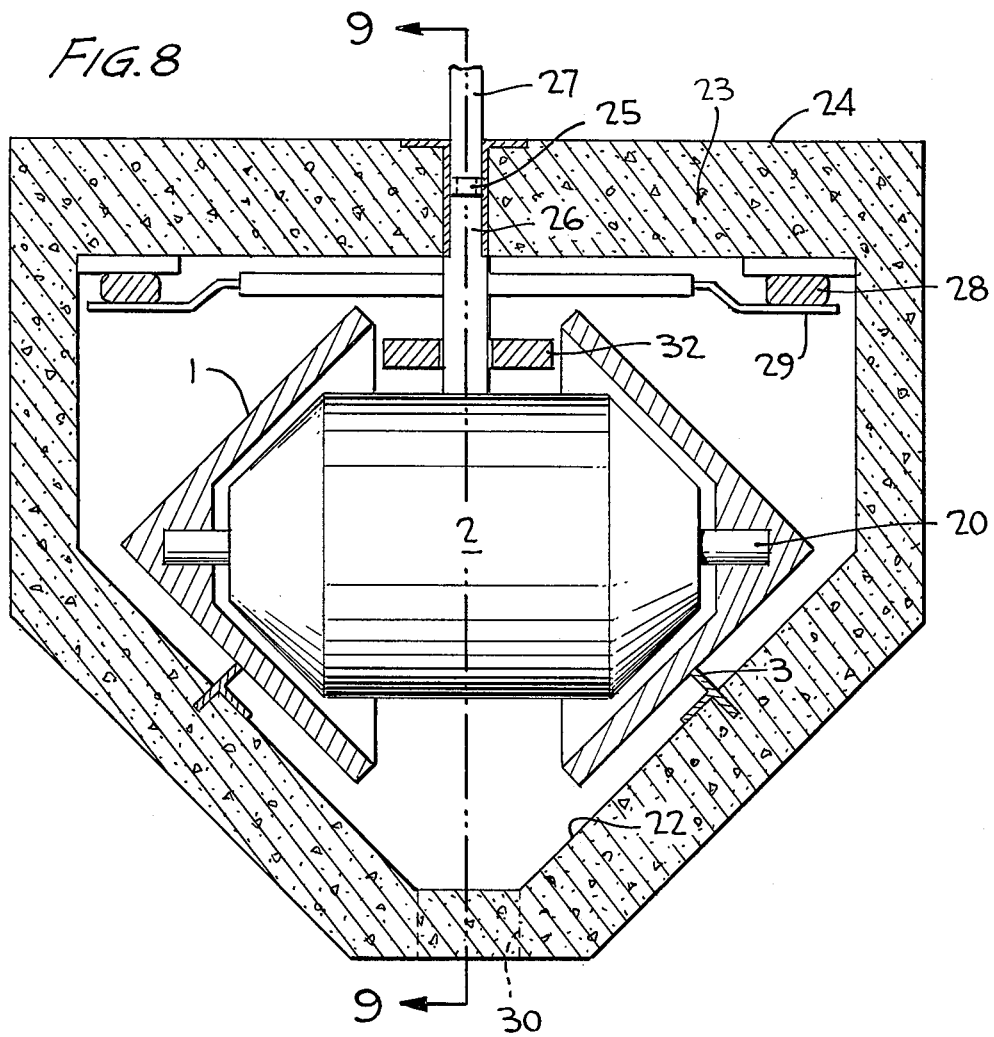
Figure 9:
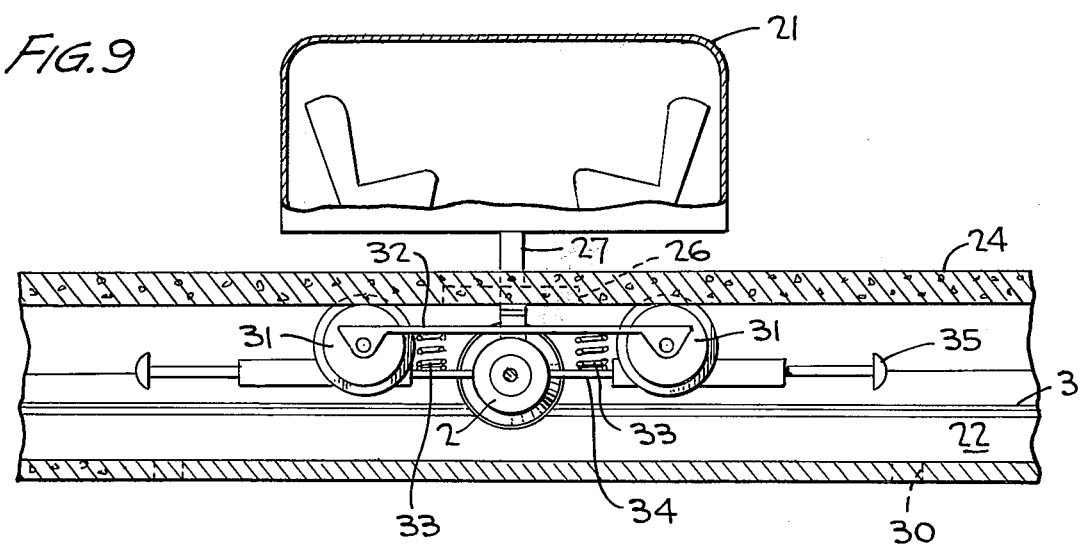

Other objects and advantages of the present invention will become apparent from the following description of the preferred embodiments taken in conjunction with the accompanying drawings in which FIG. 1 is a broken front elevation of apparatus for controlling the speed of a track-guided vehicle according to the present invention; FIG. 2 is a broken top plan view of speed regulating rails and a track for use with the apparatus of FIG. 1; FIG. 3 is a broken front elevation of a modification of the apparatus of FIG. 1; FIG. 4 is a vertical section of another embodiment of apparatus for controlling the speed of a track-guided vehicle according to the present invention; FIG. 5 is a vertical section of a modified conical member and speed regulating rail according to the present invention; FIG. 6 is a vertical section of a further embodiment of apparatus for controlling the speed of a track-guided vehicle according to the present invention; FIG. 7 is a vertical section of an additional embodiment of apparatus for controlling the speed of a track-guided vehicle according to the present invention; FIG. 8 is a vertical section of a modification of the embodiment of FIG. 7; and FIG. 9 is a section taken along line 9—9 of FIG. 8.

Apparatus for controlling the speed of a vehicle guided along a track in accordance with application (A) of the present invention is illustrated in FIGS. 1 and 2 and includes a vehicle having a frame with a trestle 5 supporting a pair of directly coupled electric motors 2 which rotatably drive bevels or conical members 1 in contact with a pair of speed regulating rails 3, respectively. The trestle 5 mounts the motors 2 in suitable bearings and supports the vehicle and its cargo such that the friction between the conical members 1 and the rails 3 is sufficient to transfer rotational work from the motors 2 to drive the vehicle which has coach wheels, not shown, of conventional design.

As the vehicle must have at least another pair of wheels 6 running on conventional tracks 4 for steering purposes, the pair of wheels 6 can be driven by an electric motor in a conventional manner with the provision that the motor has an automatically variable number of revolutions since the motors 2 driving the bevels 1 must operate with a constant number of revolutions to guarantee a programmed trip rate or speed at every track point. The advantage of an extra motor having a variable number of revolutions is that this motor can ensure the starting work and the top work of the acceleration. The trestle of the frame 5, on which the conical members 1 and their motors 2 are mounted, should suitably be raisable above the tracks such that the speed regulating rails when necessary can be thrown out of gear. This may be necessary at station passages or when the vehicle is standing at stations. The device permits mechanical unloading and loading, for instance of containers, anterooms to passenger wagons ("platforms") or light electric passenger cars. As such mechanized unloading and loading can be carried out quickly, it would be less suitable to stop and start the heavy driving conical members and their motors in connection with such short stops. When raising the conical members above the rails their load should be transferred to the conventional pair of wheels 6 on the track 4. This is easiest carried out, if the driving conical members 1 on the pair of wheels 6 are supported on a cradle-like device in order that the conical members and the wheels can be alternately brought in contact with their respective tracks and rails. This rocking movement can be rather small so that the flanges on the wheels 6 are steered along the sides of the tracks when the contact surfaces of the wheels are raised above the tracks. Accordingly, the positioning of the conical members 1, which is a condition for the programmed contact with the regulator rails 3, is guaranteed, the speed regulating rails 3 varying in distance from the tracks 4 to contact the conical members 1 at points of varying diameter such that with decreasing diameters at the point of contact, the speed of the vehicle is decreasing and with increasing diameters at the point of contact, the speed of the vehicle is increasing.

A modification of the apparatus of FIG. 1 in accordance with application (A) of the present invention is shown in FIG. 3, where the regulator rails 3 are positioned on or constitute a profiling of a girder 7 having a triangular section. This design is suitable where the track is desired to be supported on piers, the structure of the modification of FIG. 3 being substantially the same as that of FIG. 1 with the exception that the axis of the conical members 1 and the motors 2 are disposed vertically rather than at an angle to the vertical as in FIG. 1. The application (B), where the rotatable conical members of a vehicle is not driving but only rate adjusting, can be carried out, for instance by the apparatus of FIG. 4. The rotatable conical member mounts 1 a centrifugal governor 8 which in a known manner, displaces a bar 10 aligned with the axis 9 of the conical member 1, which bar in a known manner operates an adjustable resistor in the electric circuit of electric motors, which in a known manner impel the vehicle. For the embodiment of FIG. 4, the conical member 1 should contact the speed regulating rail 3 only due to its own weight and, therefore, a bearing housing 11 for the conical member 1 is slidable in the axial direction in an outer housing 12 supported on the front 14 of the vehicle. An electromagnet 13 is mounted in the housing 12 above the bearing housing 11 such that the bearing housing 11 and the conical member 1 can be raised up to space the conical member from the speed regulating rail. As the main principle of the invention is that the rate of a vehicle shall be dependent on the circumference or diameter of the conical member described by the continuous contact of the conical member on a curve shaped speed regulating rail relative to the track, the number of revolutions of the conical member should be substantially constant. Thus, a certain number of revolutions must via the centrifugal governor correspond to a definite coupling position of the resistor in the electric circuit of the driving motors which should have a variable number of revolutions. Thus, when changing the rate of the vehicle this number of revolutions must be changed. If their loads are not changed the driving motors will tend to maintain their established number of revolutions constant, but if working or contact points of the regulator rail with the conical member describe a curve in alignment, this constant number of revolutions would bring about a change of the number of revolutions of the conical member. Accordingly, the centrifugal governor 8 starts to function and, via the displacable bar 10, it changes the resistance in the current conductor to the driving motors so that their rate of revolutions is changed. In order that the number of revolutions of the conical member will be substantially constant, a small change in the centrifugal force should give a fairly great deflection in the resistance regulating circuit. In a known manner it is possible to enlarge the movement of the centrifugal governor, for instance hydraulically.

In the arrangement with the centrifugal governor, the conical member stands still when the vehicle is standing still. For acceleration from zero, the contact between the rail and the surface of the conical member is established near the tip of the conical member. The moment, which in a short time is to drive up the number of revolutions of the conical member to the constant number of revolutions, is thus small in relation to the inertia factor of the conical member, and there is a risk that it will skid. In order to prevent this the conical member can be provided with 16 on the surface near its tip as shown in FIG. 5, and the rail can be supplied with corresponding cogs at the corresponding acceleration areas.

Another embodiment for the application (B) in accordance with the present invention is to supply the conical member 1 with a small electric motor 17, which normally keeps the rotation of the conical member constant as shown in FIG. 6. In the bearing housing 11, another motor 18 is mounted having the same geometric axis of rotation as motor 17. Motor 18 should rotate as constant as possible. On their axle journals the motors have two discs or cylinders 19a and 19b, sliding towards each other and forming a rotating resistance together in the electric circuit of the driving motors of the vehicle. The statter of electric motor 17 is secured in the bearing housing 11 such that the axes of the motors 17 and 18 coincide and the bearing housing 11 along with the conical member 1 are raisable above the speed regulating rail 3 by means of electromagnet 13 mounted in outer housing 12 to space the conical member from the speed regulating rail. In a known manner the two resistor parts 19a and 19b should be connected by means of current conducting slide contacts (not shown on the drawing). A slight change of the number of revolutions of the motor 17 causes a great change in the angle between the resistor parts 19a and 19b which, for a known design thereof, brings about a rapid change of the current supplied to the driving motors. Since, in this embodiment the conical member is always rotating, it must not be supplied with cogs.

In both of the embodiment of FIGS. 4 and 6 the load of the conical member on the regulator rail should be restricted to the weight of the conical member, possibly increased by means of a spring. Furthermore, the conical member with the attached devices should be displaceable, for instance in the direction of the axis of the conical member. This can be carried out, if the bearing housing or motor housing 11 of the conical member is slidably mounted in bearings in, for instance, a cylinder formed carrier or outer housing 12 supported by the vehicle 14. When standing still or during desired passing of switches the conical member together with accessories should be able to be raised above the rail, for instance, by means of the electromagnet 13 mounted in the outer housing 12.

For solely rate adjusting conical members in accordance with application (B), it is sufficient if the vehicle is supplied with one conical member mounted, for instance, at the front of the vehicle or an electric locomotive. Consequently, only one regulator rail 3 is necessary, and, as the load thereon is small, it can be of a simple construction, for instance of angle bars. The arrangement according to application (B) has, moreover, the advantage over the arrangement according to application (A) of admitting a larger ratio between the largest and the smallest contacting conical member diameters, which is the same as a large transmission ratio. At a normal width (143 cm) between the tracks 4 there is space for a regulator rail 3 providing a largest conical member diameter of about 250 cm at contact, and a smallest conical diameter of 2.5 cm which means that the conical member 1 and the rail 3 guarantee a rate ratio of 100:1.

For tracks having pronounced gradients it is preferable to construct the vehicle with driving conical members having cogs according to FIG. 5 such that the vehicle can be moved along pronounced upgrades as well as run rapidly horizontally. Driving conical members constructed in a similar manner can be used as engine parts in a general meaning.

FIG. 7 is a vertical section through the common axis of two conical members 1 connected to axle journals 20 of a motor 2 partly enclosing the mantle shaped conical members in accordance with a further embodiment of the present invention. The speed regulating rails 3 are spaced on opposite sides of the steering track 4, and the trestle 5 supports a vehicle 21. A notch or channel 22 is formed in the track girder to accommodate the conical members 1. FIG. 8 is a similar vertical section where the notch 22 is formed in a housing 23 closed to its greater part and situated under a roadway 24 having an opening in the middle in which a coupling device 26 attached to the motor 2 can slide. To the coupling device a wagon rollable on the roadway can be coupled by means of a corresponding wagon carrier 27 sliding in the opening. Current conducting rails 28 are mounted on the top of the housing 23 to be contacted by current collectors 29, and an outlet 30 is provided at the bottom of the channel 22. FIG. 9 is a vertical section in a smaller scale according to the cut 9-9 in FIG. 8 showing wheels mounted on a common girder or the like support 32, with coil springs 33 between the support 32 and protrusions 34 on the motor 2. Buffers 35 extend from opposite end of vehicle 21.

The purpose of this apparatus is mainly to provide a self-regulating adjustment of the driving conical members relative to rails 3 and a direct coupling thereof to a common motor. From railway operation, it is known that a bevel-shaped section of the pair of wheels has a self-adjusting effect and, consequently, the wear of the steering flanges of the pair of wheels decreases. Further, it is advantageous to connect the conical members directly on to the axle journals 20 of the common motor 2, and, since the motor has a substantially constant number of revolutions, an inexpensive squirrel-cage motor can be used. The rail 3 and the steering track 4 can be used as an electric conductor in that case.

Another advantage of this apparatus is that it can be carried out as a transport element as shown in FIGS. 8 and 9 which can be disconnected from the vehicle 21, which transport element preferably can be driven in the housing 23 closed to its greater part situated under the roadway 24, which housing is provided with opening 25 in which the coupling device 26 mounted on the motor 2 can slide. The vehicle 21 can be coupled thereto by means of the corresponding wagon carrier 27 slidable in the same opening. The advantage hereof is that the housing 23 with its transport element can be delimited to certain acceleration spaces, for instance a station track, where the channel forms a closed loop. To the transport elements in housings, via its couplings 26, vehicles having an arbitrary character can be coupled via the wagon carriers 27 which, when the vehicle has achieved desired rate, can be detatched from the couplings 26 in order that the vehicle can continue by itself. The advantage hereof is partly that the more power demanding acceleration motors can be delimited to station spaces and the like, while less power demanding driving at a more constant rate can be attended to by smaller motors of the vehicles such that the vehicles will not inevitably be track-bound in consequence thereof. They can be constructed so that they can be driven to and from stations on a conventional roadway under manual steering in order within the track network to be driven driverless, so called auto- and ambi traffic.

As the weight of the wagon 21 in such a case does not rest upon the driving conical members, the conical members should be sufficiently connected to the driving rail 3 by means of coil springs 33 between protrusions 34 on the motor 2 and a vertically movable girder or the like 32 carrying wheels 31 lying close to the ceiling of the channel 23. In order to prevent a direct collision between wagons 21 the transport device or its protrusions 34 are supplied with buffers 35. Moreover, the closed channel has the advantage that current conducting rails 28 can be protected when placed therein, as well as the current collectors 29 of the motor. As to squirrel-cage motors, the regulator rail 3 can be used to conduct the third phase thereof.

I claim:

1. Apparatus for automatically controlling the speed of a vehicle guided along a track comprising at least one conical member mounted for rotation about a fixed axis on the vehicle, and speed regulating rail means disposed along the track and varying in distance from the track, said conical member contacting said speed regulating rail means with the point of contact with said speed regulating rail means varying with the varying distance of said speed regulating rail means from the track such that said speed regulating rail means contacts said conical member at points of decreasing diameter for decreasing speed and at points of increasing diameter for increasing speed.

2. Apparatus for automatically controlling the speed of a vehicle guided along a track as recited in claim 1 and further comprising motor means mounted on the vehicle to drive said conical member at a constant rotational speed whereby the speed of the vehicle is controlled by the distance between the track and said speed regulating rail means.

3. Apparatus for automatically controlling the speed of a vehicle guided along a track as recited in claim 2 wherein at least a pair of said conical members are mounted on the vehicle to carry at least a portion of the weight of the vehicle.

4. Apparatus for automatically controlling the speed of a vehicle guided along a track as recited in claim 1 and further comprising means carried by the vehicle for raising said conical member out of contact with said speed regulating rail means.

5. Apparatus for automatically controlling the speed of a vehicle guided along a track as recited in claim 1 and further comprising driving motor means for driving the vehicle along the track and means responsive to the speed of rotation of said conical member to operate said driving motor means to control the speed of the vehicle.

6. Apparatus for automatically controlling the speed of a vehicle guided along a track comprising at least one conical member mounted for rotation about its axis on the vehicle, and speed regulating rail means disposed along the track and varying in distance from the track, said conical member contacting said speed regulating rail means with the point of contact with said speed regulating rail means varying with the varying distance of said speed regulating rail means from the track such that said speed regulating rail means contacts said conical member at points of decreasing diameter for decreasing speed and at points of increasing diameter for increasing speed and further comprising centrifugal governor means responsive to said conical member and means responsive to movement of said centrifugal governor means adapted to control an adjustable resistor in an electric circuit supplying electricity to motor means for driving the vehicle.

7. Apparatus for automatically controlling the speed of a vehicle guided along a track as recited in claim 6 wherein said centrifugal governor means includes a first electric motor mounted coaxially with said conical member for driving said conical member with a constant rotational speed, a second electric motor mounted coaxially with said conical member and rotating with the same rotational speed as said first electric motor and a pair of rotatable resistor discs slidably engaging each other and rotated by said first and second electric motors, respectively, to provide a controlled resistance in an electric circuit for a driving motor such that a change in the speed of rotation of said conical member changes the angle between said resistor discs to control the speed of the vehicle.

8. Apparatus for automatically controlling the speed of a vehicle guided along a track comprising a pair of conical members carried by the vehicle and driven around a common axis of rotation, and speed regulating rail means disposed along the track and varying in distance from the track, said speed regulating means including a pair of regulator rails extending from the sides of a substantially V-shaped channel to contact said pair of conical members, respectively, said conical member contacting said speed regulating rail means with the point of contact with said speed regulating rail means varying with the varying distance of said speed regulating rail means from the track such that said speed regulating rail means contacts said conical member at points of decreasing diameter for decreasing speed and at points of increasing diameter for increasing speed.

9. Apparatus for automatically controlling the speed of a vehicle guided along a track as recited in claim 8 and further comprising a driving motor disposed within recesses formed in said pair of conical members to simultaneously drive said pair of conical members.

10. Apparatus for automatically controlling the speed of a vehicle guided along a track as recited in claim 9 wherein said substantially V-shaped channel is defined by a substantially closed housing disposed beneath the track for the vehicle, said housing having a central opening therein, and a coupling device connected with said motor and slidably extending in said central opening whereby the vehicle can be coupled to said coupling device.

11. Apparatus for automatically controlling the speed of a vehicle guided along a track as recited in claim 10 and further comprising a support mounting wheels adapted to contact the top of said housing and spring means mounted on said support to bias said pair of conical members against said speed regulating rails.

12. Apparatus for automatically controlling the speed of a vehicle guided along a track comprising at least one conical member mounted for rotation about its axis on the vehicle, and speed regulating rail means disposed along the track and varying in distance from the track, said conical member contacting said speed regulating rail means with the point of contact with said speed regulating rail means varying with the varying distance of said speed regulating rail means from the track such that said speed regulating rail means contacts said conical member at points of decreasing diameter for decreasing speed and at points of increasing diameter for increasing speed wherein said speed regulating rail includes an elongate girder having a triangular cross-section and at least one speed regulating rail extending transversely therefrom.

13. Apparatus for automatically controlling the speed of a vehicle guided along a track comprising at least one conical member mounted for rotation about its axis on the vehicle, and speed regulating rail means disposed along the track and varying in distance from the track, said conical member contacting said speed regulating rail means with the point of contact with said speed regulating rail means varying with the varying distance of said speed regulating rail means from the track such that said speed regulating rail means contacts said conical member at points of decreasing diameter for decreasing speed and at points of increasing diameter for increasing speed further comprising means carried by the vehicle for raising said conical member out of contact with said speed regulating rail means wherein said raising means includes a cradle mounted in bearings on the underside of the vehicle, and the vehicle has a pair of flanged wheels for guiding the vehicle along the track, said cradle being pivotal to move said conical member and said wheels to be alternately raised to a free wheeling position above the track while said flanges of said wheels are maintained in steering contact with the track.

14. Apparatus for automatically controlling the speed of a vehicle guided along a track comprising at least one conical member mounted for rotation about its axis on the vehicle, and speed regulating rail means disposed along the track and varying in distance from the track, said conical member contacting said speed regulating rail means with the point of contact with said speed regulating rail means varying with the varying distance of said speed regulating rail means from the track such that said speed regulating rail means contacts said conical member at points of decreasing diameter for decreasing speed and at points of increasing diameter for increasing speed further comprising means carried by the vehicle for raising said conical member out of contact with said speed regulating rail means wherein said raising means includes an electromagnet and said conical member is connected with a bearing housing adapted to be moved by said electromagnet.

15. Apparatus for automatically controlling the speed of a vehicle guided along a track comprising at least one conical member mounted for rotation about its axis on the vehicle, and speed regulating rail means disposed along the track and varying in distance from the track, said conical member contacting said speed regulating rail means with the point of contact with said speed regulating rail means varying with the varying distance of said speed regulating rail means from the track such that said speed regulating rail means contacts said conical member at points of decreasing diameter for decreasing speed and at points of increasing diameter for increasing speed said conical member having cogs formed in the surface thereof near the tip and said speed regulating rail means having corresponding cogs formed therein to mesh with the cogs of said conical member.

\* \* \* \* \*